Jan. 4, 1966  F. GEIGER  3,227,485
MOTOR VEHICLE TOP
Filed Nov. 20, 1961  2 Sheets-Sheet 1
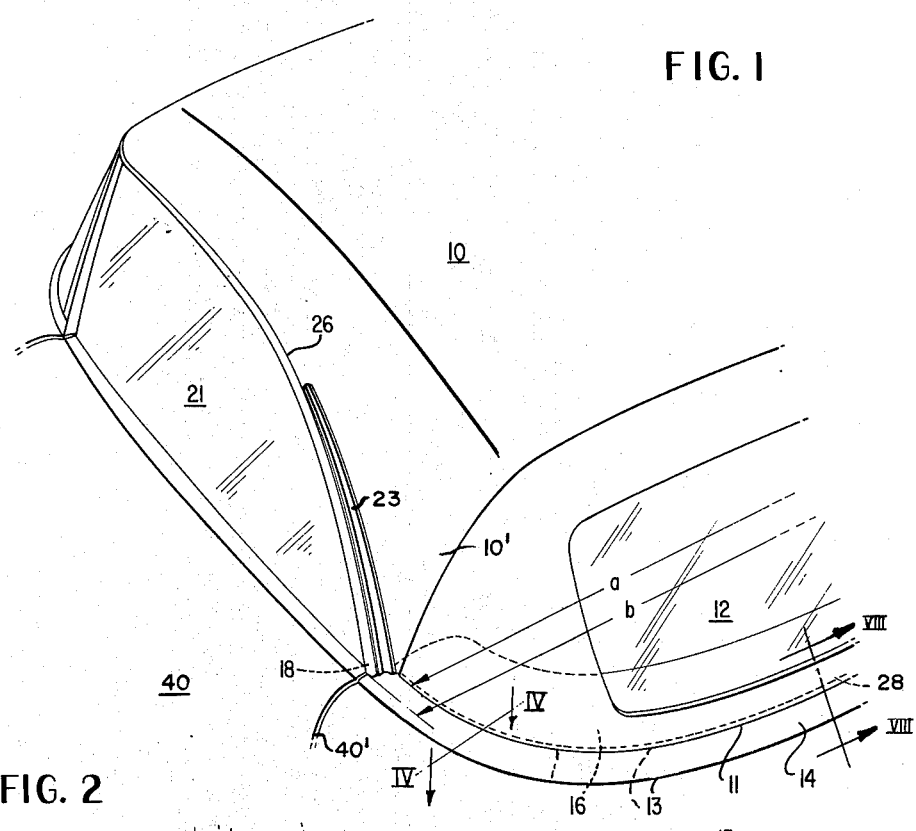
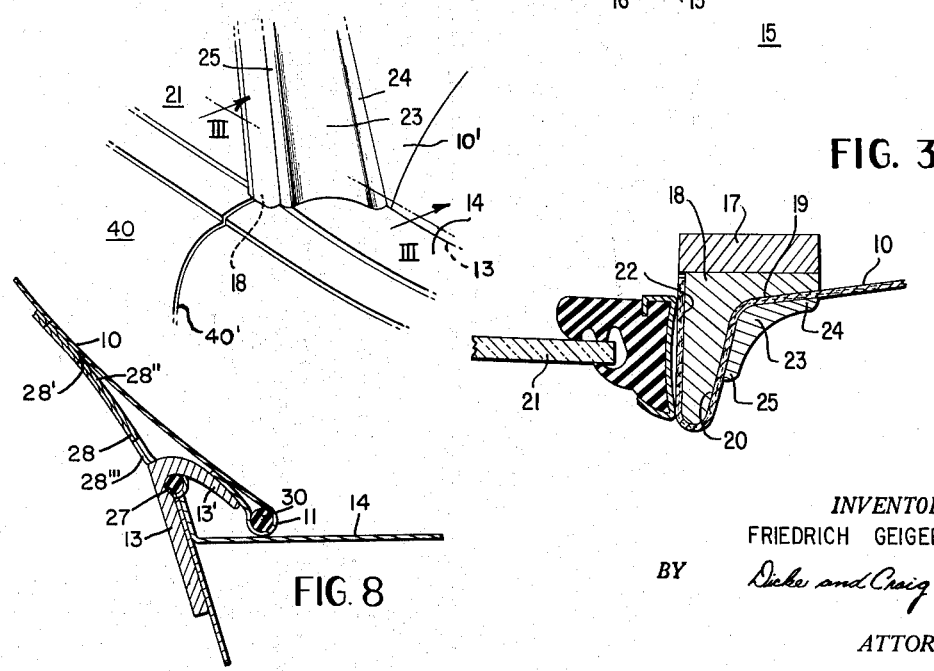
INVENTOR.
FRIEDRICH GEIGER
BY *Dicke and Craig*
ATTORNEYS Jan. 4, 1966  F. GEIGER  3,227,485
MOTOR VEHICLE TOP
Filed Nov. 20, 1961  2 Sheets-Sheet 2

INVENTOR.
FRIEDRICH GEIGER
BY Dicke and Craig
ATTORNEYS.

United States Patent Office 3,227,485
Patented Jan. 4, 1966

3,227,485
MOTOR VEHICLE TOP
Friedrich Geiger, Boblingen, Germany, assignor to Daimler-Benz Aktiengesellschaft, Stuttgart-Unterturkheim, Germany
Filed Nov. 20, 1961, Ser. No. 153,376
Claims priority, application Germany, Nov. 24, 1960, D 34,802
5 Claims. (Cl. 296—107)

The present invention relates to a passenger motor vehicle provided with a removable hard top and a foldable top the part of which facing the upper side of the vehicle body is secured at or hung into an angularly-shaped sectional member.

With the prior art passenger motor vehicles equipped with a foldable roof which is stored during non-use thereof in a roof compartment provided with a cover, an angularly-shaped rail or sectional member arranged at the cover serves for purposes of fastening the foldable roof. The cover for the top compartment which is connected by means of joints with the bow-shaped transverse member of the vehicle body disposed behind the compartment for the top and which is placed over or slipped over the leg portions of the joint constructed as pins, then has to be pulled out of the pins if a hard top roof is to be installed in the vehicle in the place of the foldable roof. This is so as with the known prior art constructions the pins of the joint also serve for purposes of fastening or securing the rear section of the hard top. The prior art plug-type connection, therefore, does not permit taking along the cover for the compartment of the foldable top when the hard top is mounted on tthe vehicle so that the foldable roof taken along in the roof compartment cannot be raised since the cover together with the sectional rail member mounted thereon cannot be taken along in such prior art constructions. It is, therefore, not possible to utilize the known passenger motor vehicle in an alternate manner, i.e., either with the hard top or with the foldable convertible top, for example, on a vacation trip since the cover for the compartment accommodating the foldable top necessitated for raising the foldable roof has to be left back in the garage when the hard top is mounted on the vehicle.

The present invention is concerned with the task of eliminating the aforementioned shortcomings.

The present invention essentially consists in arranging the rail member on a rigid vehicle body part and constituting the same a common connecting element for the foldable top and the hard top which common connecting element serves both for securing the foldable top as well as a form-locking support of the hard top; the sectional rail member is advantageously secured behind the compartment for the foldable top on a rigid bow-shaped transverse member of the vehicle body and the free leg portion of the sectional rail member is inclined, within the area of the rear vehicle body part, at an acute angle to the surface of the bow-shaped member and passes over, within the area of the lateral vehicle body part, into a hairpin-shaped cross section. By the use of such an arrangement is is possible to drive the passenger motor vehicle alternately with the hard top or the foldable convertible top since the cover for tthe compartment accommodating the foldable top only has to fulfill the one purpose, namely to cover the compartment with or without the foldable top stored therein.

However, it follows from the arrangement of the sectional rail member on the fixed vehicle body part that the distance between the two lateral parts of the sectional rail member leading toward the door openings is the same for both the hard top as well as the convertible top. As a result thereof, there exists for the hard top as well as the convertible top the difficulty by reason of the different wall thicknesses and reinforcements at the lower rim portions that either the hard top protrudes beyond the outer contour of the side windowpane in order to enable the foldable top to close in a flush and snug manner with the side windowpane or that the foldable top has to be recessed into the vehicle interior space in order that the hard top coincides with the outer contour of the side windowpane.

In order to overcome these difficulties which might also result in unfavorable streamlining conditions at the vehicle, the present invention provides an arrangement according to which the side parts of the sectional rail member disposed approximately in the longitudinal direction of the vehicle and led around up to the door opening have a lesser distance from each other than the struts for the foldable top disposed within the plane of the side windowpane. The resulting difference between the two distances is compensated in accordance with the present invention by the arrangement of fixed cover parts which are attached at the struts over the cover material of the foldable top so that a gradual streamlined transition takes place between the outline of the side windowpanes and that of the side walls of the foldable top.

A further feature of the present invention consists in constructing the cover parts simultaneously as decorative strips and to make these cover parts of angular cross section the leg portions of which taper up to the upper edge of the side windowpane.

Accordingly, it is an object of the present invention to provide a top construction for vehicles permitting the interchangeable use of the hard top or convertible top which eliminates the shortcomings and inadequacies of the prior art.

It is another object of the present invention to provide a mounting and storage for the foldable top of a motor vehicle as well as a mounting for the hard top which permits the continued presence of the folded top in a storage compartment provided therefor within the vehicle while permitting at the same time the installation of the hard top whereby the foldable top may be raised again as soon as the hard top is removed.

Still a further object of the present invention resides in the provision of mounting and storage means for the foldable top and interchangeable hard top of a motor vehicle in which the support and cover parts are so constructed as to minimize any adverse effects on the streamlining of the vehicle and/or the aesthetic appearance thereof.

These and other objects, features and advantages of the present invention will become more obvious from the following description when taken in connection with the accompanying drawings which shows, for purposes of illustration only, one embodiment in accordance with the present invention, and wherein FIGURE 1 is a partial perspective view of a passenger motor vehicle provided with an unfolded or raised convertible top;

FIGURE 2 is a partial perspective view, on an enlarged scale, of a portion of the left side part of the construction of FIGURE 1;

FIGURE 3 is a cross sectional view taken along lines III—III of FIGURE 2;

FIGURE 8 is a cross sectional view, on an enlarged scale, similar to FIGURE 7 and taken along line VIII—VIII of FIGURE 1.

Figure 7:
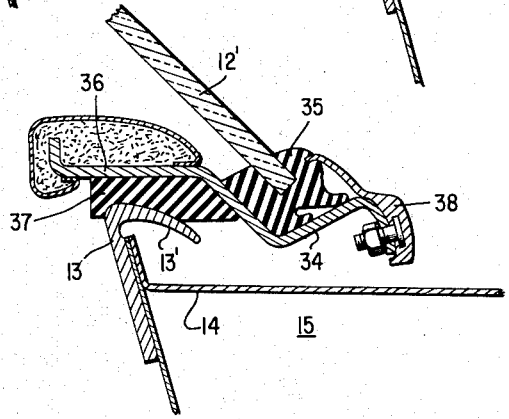
FIGURE 7 is a cross sectional view, on an enlarged scale, taken along line VII—VII of FIGURE 5.

Referring now to the drawing wherein like reference numerals are used throughout the various views to designate corresponding parts, and more particularly to FIGURE 1, reference numeral 10 designates therein the raise convertible foldable top of a passenger motor vehicle that is adapted to be lowered and stored away in folded condition, and which is inserted or hooked with the lower rim portion 11 thereof (FIGURES 1, 4, and 8) and an associated tensioning member 28 to be described later into a rail member 13 of angular cross section within the area of the rear window 12, when the foldable top 10 is to be raised. The configuration of the rail member 13 of angular cross section, including the free leg portion 13' thereof within the area of the rear window 12 is shown in FIGURES 7 and 8. The sectional rail member 13 is suitably secured at a bow-shaped transverse member 14 of the rear vehicle body generally indicated by reference numeral 15. The box-shaped compartment 16 for the foldable top 10 is disposed in front of the rear vehicle body 15, as viewed in the driving direction, in which is stored the convertible top 10 when the same is lowered by any suitable conventional means. The cover material of the top 10 abuts against the outer surface of an auxiliary strut 18 arranged at the collapsible main strut 17 (FIGURE 3) and of angular cross section. The mechanics of the collapsible strut assemblies do not form a specific part of the invention since collapsible or foldable convertible top supporting frame members are well known. It is sufficient for purposes of this invention that it be understood that the strut assemblies are to be collapsed inwardly and rearwardly when the foldable top is lowered, and preferably the strut assemblies are to be pivoted so as to lie within the compartment 16 and out of sight when the compartment cover (not shown) is placed thereon. The cover material of top 10 is secured in any suitable conventional manner at the adjoining surfaces 19 and 20 as well as at the surface 22 of the strut 18 facing the side windowpane 21 as shown in FIGURE 3. A cover part 23 which bridges the distance between the struts 18 and the lateral portions 10' of the top 10 and which is simultaneously constructed as decorative strip, abuts against a corresponding one of the struts 18 of which one is provided on each side of the vehicle. The leg portions 24 and 25 of each of the cover parts 23 taper off up to within the area near the upper edge 26 of the side windowpane 21 (FIGURE 1). The lateral parts (FIGURE 1) of the angularly shaped rail member 13 which are disposed approximately in the vehicle longitudinal direction and extend to the door openings 40' are spaced a smaller distance $a$ from each other in the vehicle transverse direction than the distance $b$ of the struts 18 which are disposed within the plane of the side windowpanes 21 provided in doors 40. The difference in the distances $a$ and $b$ is bridged effectively by the tapered cover parts 23 forming decorative strips when each of the collapsible main strut assemblies 17 18, 23 is raised into position to support the foldable top.

Figure 4:
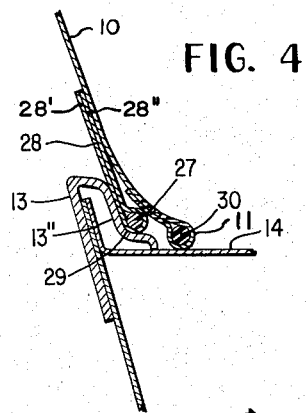
FIGURE 4 is a cross sectional view taken along line IV—IV of FIGURE 1.

The angularly-shaped rail member 13 which is constructed of angular shape with a free leg portion 13' (FIGURES 7 and 8) within the area of the rear window, is constructed in a hairpin like-manner as shown in FIGURE 4 by reference numeral 13" within the area of the side parts 10' or 31' of the top 10 or 31, respectively. A tensioning or clamping member 28 extends on the inside of the top transversely over the entire width of the vehicle, effectively forms a loop 29 and is secured with the two ends 28' and 28" thereof to the top in any suitable conventional manner, for example, by stitching, vulcanizing or any other known manner. The tightening member 28 is provided with a wire insert 27 within the loop portion 29 thereof, and within the area of the rear part of the top 10 is hooked into the free leg portion 13' of the hook-shaped rail member 13 of angular cross section (FIGURE 8). The ends of the wire insert 27 are secured on both sides of the vehicle to the auxiliary struts 18 or to the main struts 17 in any suitable manner. A conventional tensioning mechanism of suitable construction (not shown) is interposed within the tightening member 28 for purposes of actuation in any suitable known manner after the loop portion 29 containing the wire insert 27 is hooked into the free leg portion 13' of the angularly sectioned rail member 13. As a result of such an arrangement, the foldable top, when raised, and after the interposed tensioning mechanism is actuated, adapts itself to the form of the angularly sectioned rail member and rests tautly on the transverse struts. The top 10 is provided at the lower rim thereof with a seal 30 (FIGURE 4) which also rests securely on the transverse bow-shaped member 14 of the rear vehicle body.

Figure 5:
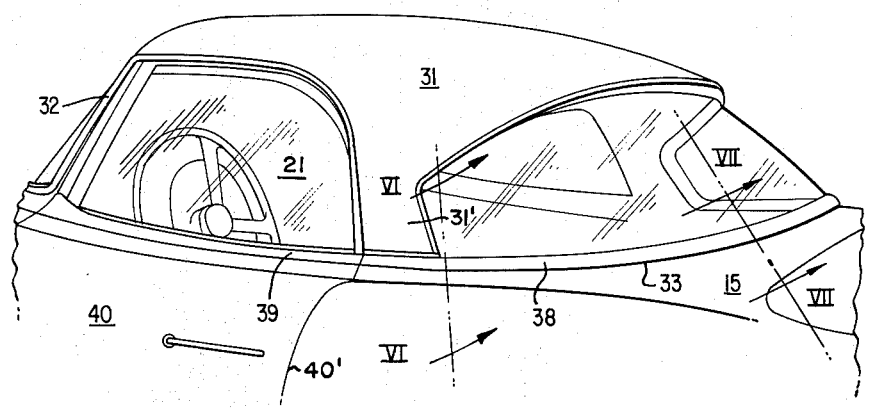
FIGURE 5 is a perspective view of a passenger motor vehicle similar to FIGURE 1 with the hard top mounted on the vehicle.

If the unfolded or raised top 10 is to be replaced with a hard top 31, illustrated in FIGURE 5, then the conventional clamping and tensioning devices not shown arranged at the windshield frame 32 are disengaged or released in any suitable conventional manner, the top 10 is folded back, the rear clamping and tensioning mechanism for the tightening member 28 and wire insert 27 is also released for slackening the tensioning member 28, the clamping and tensioning member 28 is moved out of the angularly sectioned rail member 13, and each of the individual strut assemblies 17, 18, 23 are simultaneously displaced or collapsed inwardly by any convention means. The folded roof may now be stored within the top compartment 16.

Figure 6:
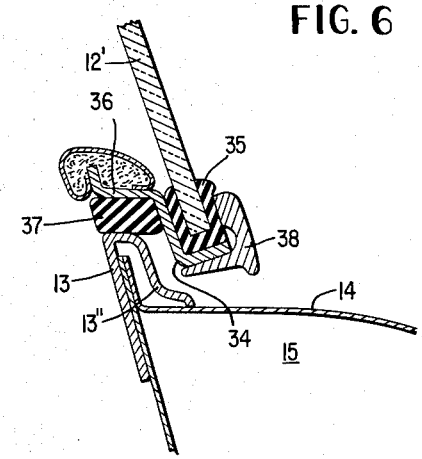
FIGURE 6 is a cross sectional view taken along line VI—VI of FIGURE 5.

FIGURE 5 illustrates a passenger motor vehicle with a hardtop 31 of which the rim portion 33 facing the vehicle body 15 consists of a sectional rail member 34 constituting the rearward edge of the hard top on which is embedded, within a suitably sectioned rubber sealing element 35 (FIGS. 6 and 7), the rear window 12'. The leg portion 36 directed forwardly toward the vehicle interior rests in a form-locking manner on the angularly-shaped rail member 13 whereby an elastic sealing body 37 is disposed betwen these two elements 36 and 13. A decorative strip 38 (FIGURES 5–7) is secured to the outer edge of the sectional rail element 34 which decorative strip 38 passes over into a decorative strip 39 of the vehicle door 40. The hardtop 31, after being placed on the vehicle body 15 and on the windshield frame 32, is suitably latched and clamped thereto by any conventional latching and clamping means provided thereat.

While I have shown and described one embodiment in accordance with the present invention, it is understood the same is not limited thereto but is susceptible to many changes and modifications within the spirit and scope thereof, and I therefore do not wish to be limited to the details shown and described herein, but intend to cover all such changes and modifications as are encompassed by the scope of the appended claims.

I claim:

1. A passenger motor vehicle adapted to be used with a removable hard top having a rearward edge and with a foldable convertible top, and provided with a relatively fixed vehicle body part, comprising sectional rail means arranged at said fixed vehicle body part and constituting a common element for said foldable top and said hard top, means on said foldable top for being hooked into said sectional rail means, said sectional rail means including securing means for engaging said means on said foldable top means on said hard top so constructed and arranged as to engage said common element, said common element acting as the sole support for said hard top at said rearward edge thereof.

2. A passenger motor vehicle adapted to be used with a removable hard top having a rearward edge and with a foldable convertible top, and provided with side window means and with a relatively fixed vehicle body part, comprising sectional rail means having side parts arranged at said fixed vehicle body part and constituting a common element for said foldable top and said hard top, means on said foldable top for being hooked into said sectional rail means, strut means for said foldable top which are disposed substantially in the plane of said side window means, said sectional rail means including securing means for engaging said means on said foldable top, means on said hard top so constructed and arranged as to engage said common element, said common element acting as the sole support for said hard top at said rearward edge thereof, said side parts of said rail means disposed approximately in the vehicle longitudinal direction and extending up to said side window means having a small distance from each other than the strut means disposed substantially in the plane of the side window means.

3. A passenger motor vehicle adapted to be used with a removable hard top having a rearward edge and with a foldable convertible top, adapted to be stored within a top compartment and provided with side window means and with a relatively fixed vehicle body part, comprising sectional rail means having a free leg portion and side parts arranged at a bow-shaped transverse member of said fixed vehicle body part and constituting a common element for said foldable top and said hard top, means on said foldable top for being hooked into said sectional rail means, strut means for said foldable top which are disposed substantially in the plane of said side window means, said sectional rail means including securing means for the securing of the foldable top, means on said hard top so constructed and arranged as to engage said common element, said common element acting as the sole support for said hard top at said rearward edge thereof, said free leg portion of said rail means being inclined within the area of the rear vehicle body section at an acute angle to the surface of said bow-shaped member and passing over substantially into a hairpin-like cross section within the area of the lateral vehicle body parts of said fixed vehicle body part, said side parts of said rail means disposed approximately in the vehicle longitudinal direction and extending up to said side window means having a smaller distance from each other then the strut means disposed substantially in the plane of the side window means, and cover parts fixed with respect to said strut means which bridge the space resulting from the two different distances between said strut means and said side parts of said rail means, said cover parts being constructed as decorative strips having leg portions which taper off to within the area of the upper edge of said window means.

4. A passenger motor vehicle adapted to be used with a removable hard top having a rearward edge and with a foldable convertible top adapted to be stored within a top compartment and provided with a relatively fixed vehicle body part, comprising sectional rail means including a free leg portion arranged at a bow-shaped transverse member of said fixed vehicle body part and constituting a common element for said foldable top and said hard top, means on said foldable top for being hooked into said sectional rail means, said sectional rail means including securing means for engaging said means on said foldable top, means on said hard top so constructed and arranged as to engage said common element, said common element acting as the sole support for said hard top at said rearward edge thereof, said free leg portion of said rail means being inclined within the area of the rear vehicle body section at an acute angle to the surface of said bow-shaped member and passing over substantially into a hairpin-like cross section within the area of the lateral vehicle body parts of said fixed vehicle body parts.

5. A passenger motor vehicle adapted to be used with a removable hard top having a rearward edge and with a foldable convertible top and provided with a relatively fixed vehicle body part, comprising sectional rail means arranged at said fixed vehicle body part and constituting a common element for said foldable top and said hard top, means on said foldable top for being secured by said sectional rail means, said sectional rail means including securing means for engaging said means on said foldable top, means on said hard top so constructed and arranged as to engage said common element, said common element acting as the sole support for said hard top at said rearward edge thereof.

References Cited by the Examiner
UNITED STATES PATENTS

| 2,511,460 | 6/1950 | Cancelli et al. | 296—102 |
| 2,746,791 | 5/1956 | Gosselin | 296—107 |
| 2,772,114 | 11/1956 | Hennessy | 296—107 |
| 3,087,753 | 4/1963 | Geiger | 296—107 X |

BENJAMIN HERSH, *Primary Examiner.*

A. HARRY LEVY, PHILIP ARNOLD, *Examiners.*